(No Model.)
J. FRIEDLANDER.
COMBINED HORSE DETACHER AND BRAKE.
No. 557,373. Patented Mar. 31, 1896.
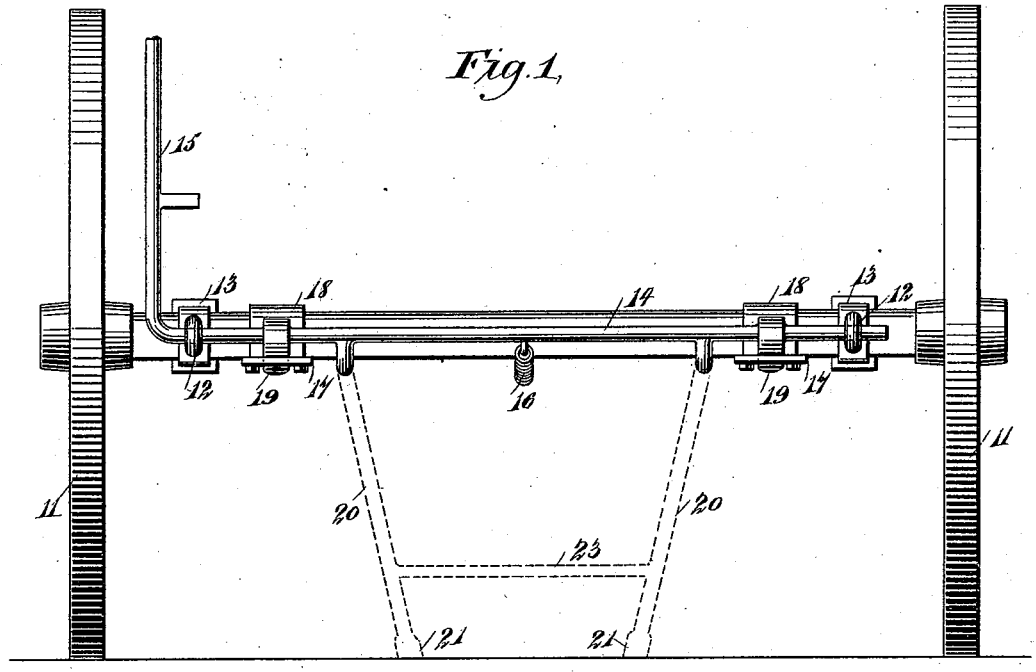
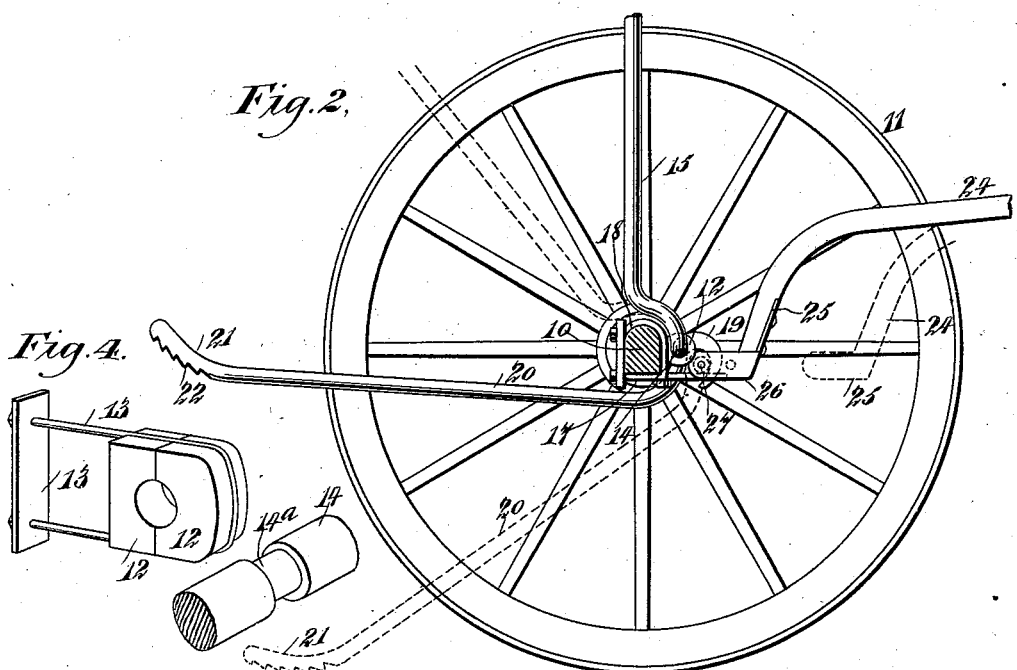
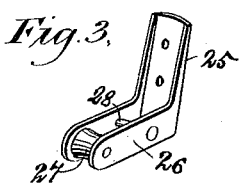
WITNESSES:
Edward Thorpe.
INVENTOR
J. Friedlander
BY Munn & Co
ATTORNEYS.

UNITED STATES PATENT OFFICE.

JOSEPH FRIEDLANDER, OF SAN ANTONIO, TEXAS, ASSIGNOR TO JOSEPHINE FRIEDLANDER, OF SAME PLACE.

COMBINED HORSE-DETACHER AND BRAKE.

SPECIFICATION forming part of Letters Patent No. 557,373, dated March 31, 1896.

Application filed November 26, 1895. Serial No. 570,206. (No model.)

*To all whom it may concern:*

Be it known that I, JOSEPH FRIEDLANDER, of San Antonio, in the county of Bexar and State of Texas, have invented a new and Improved Combined Horse-Detaching Device and Brake, of which the following is a full, clear, and exact description.

The object of the invention is to provide a horse-detaching device of simple and durable construction and applicable to any vehicle, and to combine with the said device a brake whereby the vehicle may be stopped from moving almost as soon as the animal is released from connection therewith; and the object of the invention is to simplify the construction of the horse-detaching device over that shown in the application for Letters Patent made by me October 14, 1895, Serial No. 565,581, and to so connect the brake with the detaching device that both may be simultaneously manipulated through the medium of a single lever, and whereby, further, when the brake is not in use it will occupy a position beneath the bottom of the vehicle and will be practically concealed.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a front elevation of the forward axle of the vehicle, illustrating the brake and detaching device in normal position and with the thills or shafts removed. Fig. 2 is a section through the axle, taken near one of the wheels, the horse-detaching device being shown as connected with the thills or shafts and the brake elevated in positive lines and the thills detached and the brake lowered in dotted lines. Fig. 3 is a perspective view of one of the thill-irons. Fig. 4 is a detail perspective view of a journal-box for the brake or unhitching-shaft and a similar view of that portion of the shaft adapted to enter the box.

In carrying out the invention the axle 10 (shown in the drawings) is the forward axle of the vehicle and carries the usual supporting-wheels 11. In front of the said axle bearings or boxes 12 are secured thereto by means of the clips 13 or the equivalents thereof, and in said bearings a shaft 14 is journaled, and preferably one end of the shaft is carried upward to form a lever or handle 15, whereby the shaft is turned, and the lever of the shaft is held ordinarily in a vertical position by means of a spring 16 attached to the shaft and to the axle. The boxes are preferably made in two parts, and that portion of the shaft which passes through the boxes is provided with a reduced section $14^a$, whereby end movement of the shaft is prevented.

Preferably at each side of the center of the axle a forwardly-extending plate 17 is secured to the bottom thereof by means of clips or clamps 18 or like devices. Each of these plates is provided with an opening at or near its forward end, and a hook 19 is adapted to enter the opening of each plate, the said hooks being secured in any suitable or approved manner to the aforesaid shaft 14, and when the shaft is in its normal position, held so by means of the spring 16, the hooks 19 will have entered the aforesaid keeper-plates and will be retained therein.

Between the hooks 19 a brake is secured to the shaft 14, and this brake preferably consists of two rearwardly-extending bars 20, each terminating at its outer end in a shoe 21, the shoes being at an angle to the body-bars, and their under faces are provided with teeth 22 or are otherwise roughened.

Preferably the bars 20 of the brake are secured to the under portion of the shaft and are curved downward and rearward beneath the axle, as shown in Fig. 2. When the shaft 14 is in its normal position, the bars of the brake will be in a horizontal position and will lie so close to the bottom of the vehicle as to practically be invisible. The bars of the brake are preferably made to approach at their lower ends and are connected near said points by a bar 23, and when the brake is in operation its shoes will engage with the ground, as shown in dotted lines particularly in Fig. 2.

While the brake preferably consists of two or more connected bars, it may consist of but a single bar or a number of bars attached to the shaft yet disconnected from one another.

The shafts or thills 24 are provided with irons of peculiar construction, each iron comprising a shank 25 adapted for attachment to the lower portion of the thill, and a body 26 of substantially skeleton form extends rearwardly at a right angle to the shank. The aforesaid body 26 of the thill-iron, as shown in Fig. 3, is open at its top, bottom, and rear end, and at its rear end a friction-roller 27 is journaled and a pin 28 is passed through the thill, after it has entered into the body of the iron, and through the iron for the purpose of securing the thill-iron to the thill, and one or more bolts or pins may likewise be passed through the shank of the iron.

When the thills are to be attached to a vehicle, the lever 15 is pressed downward, raising the hooks 19 from their keepers 17, and the thill-irons are then placed upon the said keepers, occupying such position that when the lever is released the spring 16 acts and the hooks 19 will pass through the thill-iron to an engagement with the friction-rollers 27 and also through the keepers 17, as illustrated in Fig. 2.

In the event the animal attached to the vehicle should become unruly or unmanageable the lever 15 is pressed downward and the hooks 19 raised, thereby releasing the thills and permitting the animal to escape. At the same time the arms of the brake-lever will be carried downward, so that their shoes will engage with the ground, and by continuing to press the said lever 15 downward the brake will be so forcibly engaged with the ground as to practically immediately stop the motion of the vehicle.

Having thus described my invention, I claim as new and desire to secure by Letters Patent—

1. In a vehicle, the combination with the front axle thereof, of a rock-shaft mounted at the front of the axle, thill-attaching hooks carried by the rock-shaft, a drag-brake fixed to the rock-shaft and capable of being pressed into engagement with the ground upon the raising of the thill-attaching hooks, and means for operating the rock-shaft, substantially as described.

2. In a vehicle, the combination with the front axle thereof, of two plates rigidly carried by the axle and projecting forwardly therefrom, a rock-shaft mounted at the front of the axle, thill-attaching hooks fixed to the rock-shaft and respectively coöperating with the plates, a drag-brake fixed to the rock-shaft and capable of being pressed into engagement with the ground upon the upward or releasing movement of the thill-attaching hooks, and means for operating the rock-shaft, substantially as described.

JOSEPH FRIEDLANDER.

Witnesses:
A. S. MILLS,
R. A. MACDONALD.